United States Patent [19]
Bijl et al.

[11] Patent Number: 5,926,279
[45] Date of Patent: Jul. 20, 1999

[54] TEST SYSTEM FOR OPTICAL AND ELECTRO-OPTICAL VIEWING SYSTEMS

[75] Inventors: Pieter Bijl, Amersfoort; Jean Mathieu Valeton, Zeist, both of Netherlands

[73] Assignee: Nederlandse Organisatie voor Toegepast-Natuurwetenschappelijk Onderzoek TNO, Delft, Netherlands

[21] Appl. No.: 08/824,053

[22] Filed: Mar. 21, 1997

[30] Foreign Application Priority Data

Mar. 21, 1996 [NL] Netherlands ............................ 1002680

[51] Int. Cl.$^6$ ............................................... G01B 11/00
[52] U.S. Cl. .......................................................... 356/388
[58] Field of Search ............................ 356/388, 391, 356/392, 393, 394; 250/495.1, 504 R, 484.1, 493.1, 252.1, 330; 358/106, 139, 93, 185, 10, 22, 107, 214

[56] References Cited

U.S. PATENT DOCUMENTS

| | | | |
|---|---|---|---|
| 4,647,783 | 3/1987 | Verona | 250/495.1 |
| 4,724,356 | 2/1988 | Daehler | 313/522 |
| 4,859,080 | 8/1989 | Titus et al. | 374/134 |
| 4,991,007 | 2/1991 | Corley | 358/106 |
| 5,126,577 | 6/1992 | Trent | 250/495.1 |
| 5,319,213 | 6/1994 | Watkins et al. | 250/493.1 |
| 5,347,128 | 9/1994 | Puram et al. | 250/330 |
| 5,471,055 | 11/1995 | Costanzo et al. | 250/252.1 |

OTHER PUBLICATIONS

R. Braddick et al., "A Novel GO–NO GO MRTD Tester and Its Development", Infrared Imaging Systems: Design, Analysis, Modeling, and Testing V, (SPIE—The International Society for Optical Engineering), Apr. 1994, vol. 2224, pp. 291–296.

R.G. Driggers et al., "Review of infrared scene projector technology—1993", *Optical Engineering*, Jul. 1994, vol. 33, No. 7, pp. 2408–2416.

*Primary Examiner*—Frank G. Font
*Assistant Examiner*—Michael P. Stafira
*Attorney, Agent, or Firm*—Young & Thompson

[57] ABSTRACT

Test system for viewing systems, such as CCD cameras, infrared viewers, or binoculars or telescopes, which test system is provided with a test object having various component test objects to be shown to the viewing system, which test object is to be placed at a distance from the viewing system and which is to be tendered displayable with the viewing system for an inspection unit (for example, a test operative), with which inspection unit the quality of the operation of the viewing system can be determined on the basis of said display, the test object comprising component test objects differing in appearance from one another and the test system being suitable for presenting said component test objects simultaneously or one after another to the inspection unit to determine a property of the displayed component test objects.

19 Claims, 4 Drawing Sheets fig-1 fig-2 fig-3

TEST SYSTEM FOR OPTICAL AND ELECTRO-OPTICAL VIEWING SYSTEMS

FIELD OF THE INVENTION

The invention relates to a test system for optical and electro-optical viewing systems, such as CCD cameras, thermal imagers, image intensifiers or telescopes. Although the invention is suitable, in particular, for testing the quality of thermal imagers which operate in the far infrared range (thermal imagers), it is in principle also suitable for other types of camera, such as cameras which are to be used with electro-magnetic radiation in the visible wavelength ranges. The invention can also be used in principle for testing some properties of the human visual system. The invention is explained in greater detail below on the basis of so-called thermal imagers, which are generally sensitive to electro-magnetic infrared radiation in wavelength ranges of 3–5 $\mu$m and 8–12 $\mu$m and are able to convert the latter into an image which is visible to the human eye. How the invention could be implemented for other viewing systems will also be explained.

The ability to test the quality of the operation of thermal imagers quickly and reliably under actual conditions of use, that is to say "in the field", is of great importance, for example, from the point of view of usability and unnecessary performance of repair work.

At present, the quality of the operation of thermal imagers can be tested virtually only in the laboratory. Mobile test set-ups do exist, but they are less suitable for routine inspection in the field since this equipment is very expensive and the measurement has to be carried out by technically highly trained staff. The consequence is that a regular inspection of in-built equipment often remains undone and work is continued for too long with defective systems. It also occurs that a system which is functioning well is mistakenly demounted after a superficial inspection and sent to the workshop. R. Braddick (1994), A novel Go-NoGo MRTD tester and its development. SPIE Proceedings, vol. 2224, 291–296, discloses a simple apparatus with which thermal imagers can be tested outside the laboratory. This apparatus is derived from the standard laboratory measurement such as that described below and consequently has a number of disadvantages. The present invention, which is based on other principles, does not have these disadvantages.

The present standard test in the laboratory is the so-called MRTD (minimum resolvable temperature difference) measurement, such as is described in NATO STANAG 4349, "Measurement of the Minimum Resolvable Temperature Difference (MRTD) of Thermal Cameras". This measurement takes place as follows: a test object is placed in front of the thermal image system to be tested. Said object comprises a black metal plate of uniform temperature having 4 vertical or horizontal slots which are cut out in it and which are placed at an equal distance from one another and aligned. The plate is placed in front of a black radiator whose temperature can be varied. A bar pattern can be generated with this which has a freely adjustable temperature difference with respect to its direct environment. A test operative or observer views the visible image of the bar pattern formed by the infrared camera and assesses the temperature difference at which he can observe the bars separately. During the test, patterns of different size are generated so that the required temperature difference can be determined for very coarse patterns down to the resolution limit of the camera. For viewing systems in the visible or near-infrared wavelength range (for example, image intensifiers), there are similar tests. An important disadvantage of this procedure is that the subjective judgement of the test operative has an important effect on the result of the test. In addition, the bar patterns used are essentially unsuitable for testing modern electro-optical viewing systems, which are constructed from detector arrays or matrices. In the region of the resolution limit, said viewing systems introduce deformations of the pattern which make a reliable judgement by the observer impossible. Further, it is very difficult to make the present standard test suitable to be carried out in the field due to the sensitivity of the camera systems to temperature differences. In particular, for the coarse patterns, the minimum temperature required between the plate and the black radiator situated behind it can only be generated reliably under laboratory conditions.

The object of the present invention is to provide a test system with which it is possible for operatives at maintenance level to test, both in the field and in the workshop, whether electro-optical viewing systems meet the required quality without said systems having to be demounted. The test procedure can be carried out simply, and is also free of the abovementioned disadvantages of the known standard procedure. In addition to accepting or rejecting a system on the basis of predetermined requirements, an option can also be incorporated with which quantitative data can quickly be determined for a sensor system for which no data are known.

SUMMARY OF THE INVENTION

For this purpose, the present invention provides a test system according to the combination of measures such as is reproduced in the appended claim 1.

The present invention is based on the insight that a much better test procedure can be achieved by providing images or patterns whose appearance is partly or completely unknown beforehand to the inspection unit, such as a test operative or a computer. The term "appearance" is understood here as meaning the size, orientation, brightness or temperature, shape or position of the image provided, or combinations thereof. A judgement is expected from the inspection unit or test operative on the appearance of the various patterns, in which connection, for example, a choice has to be made from a number of alternatives. It is also possible to arrange for the appearance of the pattern to be judged not by a test operative but by a suitable automatic recognition system. In this connection, such a recognition system may make use of the image which is generated by the viewing system to be tested or possibly of an output signal (for example, a video signal) of the camera. "Test operative" is implicitly understood below as also meaning "automatic recognition system".

With sufficient presentations, the correct and the incorrect responses of the test operative objectively indicate in the case of such a task how well an observer is able to distinguish the patterns from one another with the aid of the respective viewing system. In addition, the task is much more in harmony than the abovementioned standard test with the detection and recognition tasks for which the viewing systems are generally used. As an example, dots of different size and different temperature difference (positive or negative) with respect to a background can be presented by means of the invention, for example simultaneously or successively. The inspection unit can be asked, for example, which of the dots exhibits a positive or negative temperature difference with respect to the background. Using the correct scores, it is possible to investigate which combination of dot size and temperature difference can still be detected by the inspection unit.

It can be shown that the standard bar pattern is unsuitable in the case of such a procedure for determining the resolution limit for a pixel-array camera system. In the version which is preferred here, test patterns in the form of equilateral triangles having a certain temperature difference with respect to a uniform background are generated and presented to the system to be tested in order to determine the resolution limit of a camera system. The equilateral triangles may, for example, take one of four mutually different orientations (with the apex directed upwards, downwards, to the left or to the right, respectively). In addition, they may also optionally vary in size. The temperature difference may also optionally vary, although the version of the present invention which is advantageous at present does not make use thereof. Finally, in the version which is provisionally preferred here, the position of the patterns is varied. This is particularly advantageous for a correct testing of the resolution performances of camera systems having a detector array, such as, for example, a focal plane array camera (a thermal imager of the latest generation) or a CCD camera.

Furthermore, the inventors recognize the importance of testing not only the resolution performance, but also the sensitivity of the system to small temperature differences (thermal contrast). It is expected that these tests together will provide a reliable test result. Reference has already been made above to the disadvantages of the known way in which the thermal test patterns are generated when used outside the laboratory or test room, namely the generation of a temperature difference between a plate with cutouts and a black radiator situated behind it. It appears more advantageous for the reliable generation of a test pattern having a very small temperature difference with respect to its surroundings to generate both pattern and surroundings on just a single plate by providing temperature differences locally on said plate. In connection with the testing of thermal imagers, this has the advantage that any temperature fluctuations in said plate, for example as a result of airflow or wind, occur in a similar manner for both the pattern and its surroundings, as a result of which the temperature difference continues to be maintained to a considerable degree. Moreover, said method provides more freedom in choice of pattern. If a plate having cutouts is used to generate the patterns, said patterns will always exhibit a sharp circumferential edge, i.e., an essentially constant circumferential edge temperature. In the proposed method, it is possible in principle to provide an arbitrary temperature variation across the plate. In particular, an image can be generated, for example, in which the transition between a pattern and its surroundings is not sharp, but is characterized by a gradual temperature variation (these patterns will be termed "patterns with blurred edges" or "blobs" below). For example, a pattern could be generated which has a Gaussian temperature profile. The use of such a pattern for testing the sensitivity of thermal imagers to temperature differences appears particularly advantageous since the minimum temperature difference at which such a pattern can be detected with a thermal imager is higher than for a comparable pattern having a sharp circumferential edge, and the test object will be less sensitive to temperature disturbances in the case of a higher temperature difference. In the version of the present invention which is advantageous at present use is also made of the possibility of generating one or more patterns with a blurred edge for testing the sensitivity of thermal imagers to temperature differences.

Patterns having sharp circumferential edges to be presented to the sensor to be tested are known per se from the prior art, but it is not known from the prior art to present such images or patterns whose appearance is not known in advance (partly or completely) to the test operative in order to test thermal imagers. On the other hand, use of one or more patterns to be presented to the camera having a blurred circumferential edge, regardless of whether various appearances of such images exist or not, is completely new in this specialist field. The Applicant therefore regards the testing of a camera having one or more patterns with blurred circumferential edges to be presented to the camera as a separate invention. Said separate invention is based on the following combination of measures: the test system for optical and/or electro-optical viewing systems, such as thermal imagers, CCD cameras or telescopes, is provided with a test object which is to be placed at a distance from the viewing system and has one or more component test objects and which is suitable to be presented to the viewing system and which is to be rendered displayable with the viewing system for a test operative or an automatic recognition system. In this connection, the test operative or the recognition system attempts to determine, on the basis of the display of the component test objects by the viewing system, a property of the component test objects, such as, for example, an orientation, or the sign of the temperature difference of a pattern with respect to its background. On the basis of the correct and incorrect responses by the test operative, the test system decides on the quality of the operation of the viewing system. The test system has the characteristic that the component test objects exhibit a pattern having blurred edges in order to form a gradual transition from the component test objects to their surroundings.

BRIEF DESCRIPTION OF THE DRAWINGS

The invention is explained in greater detail on the basis of a unrestrictive exemplary embodiment which is advantageous at present, with reference to drawings appended hereto. In the drawings.

DETAILED DESCRIPTION OF THE INVENTION

Figure 1:
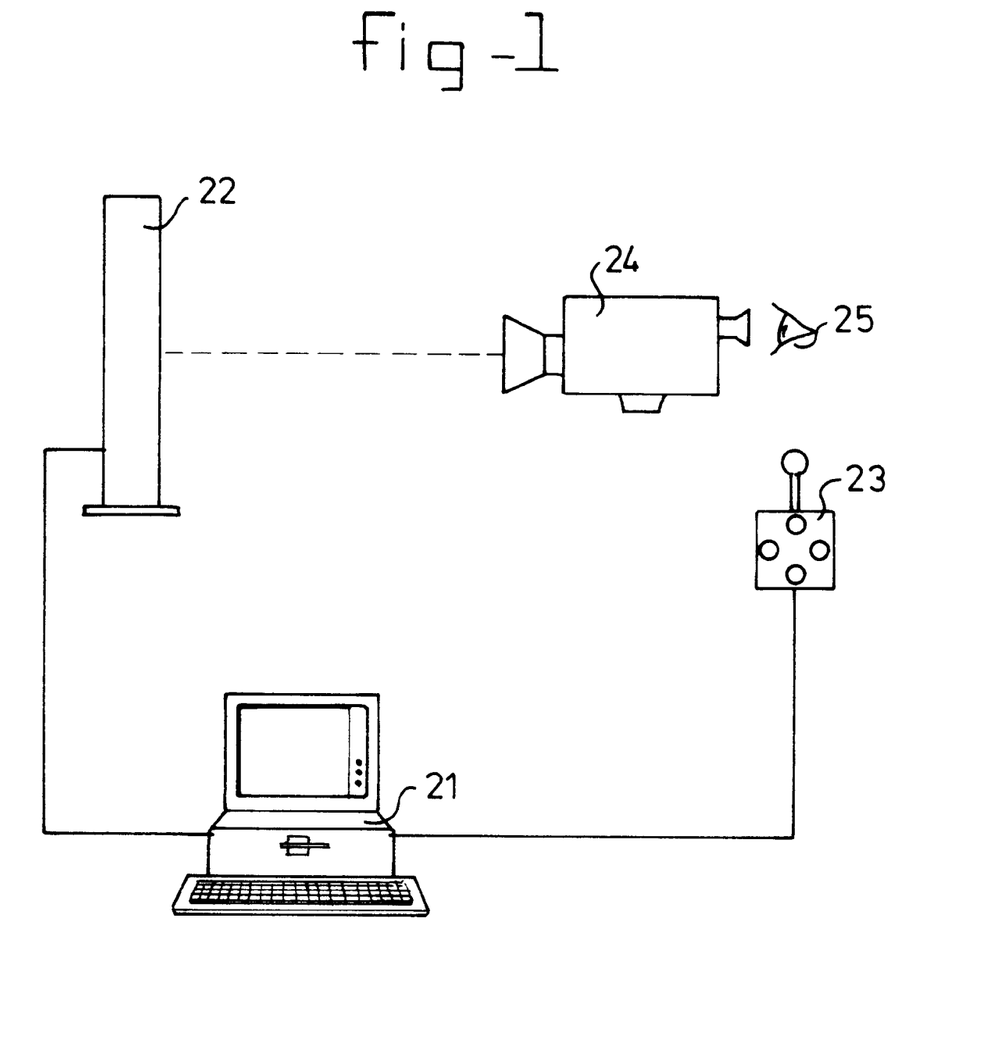
FIG. 1 shows an overview of the test system according to the invention, comprising a test supervisor, a test operative and the viewing system to be tested.

The test system shown in FIG. 1 comprises a control unit 21, a pattern generator 22, and a response unit 23. In the present exemplary embodiment, the test is carried out by two individuals, a test supervisor who operates the test equipment, and a test operative 25 who ensures an optimum adjustment of the viewing system 24 to be tested, and with the aid of the viewing system, judges the appearance of the patterns presented by the test system. The test system may optionally be automated in such a way that the test can be carried out by a single person. An adapted test system is also conceivable in which the assessment of the appearance of the patterns presented is carried out by an automatic pattern recognition system. Such a recognition system may, for example, make use of the image generated by the viewing system to be tested (via a visible-light camera placed at the position of the test operative), or optionally, it may make use of an output signal (for example, a video signal) of the camera to be tested.

The control unit 21, in the present version a PC, takes care, inter alia, of the test procedure, makes a choice relating to the appearance and the sequence of the patterns to be generated on the basis of the programmed-in algorithm, passes the choice to the pattern generator 22, and collects the responses of the test operative 25 via the response unit 23, in the present version a joystick, or in an alternative version, of the pattern recognition system. On the basis of the responses of the test operative, the control unit decides whether the performance with the tested viewing system meet preset criteria. By adapting the control programs the test system may be changed into a measurement system with which quantitative data can be collected for a viewing system for which no data are known. Criteria for the respective viewing system can be set on the basis of said data.

The pattern generator 22 takes care of the generation and presentation of the patterns chosen by the control unit. The generator is placed at a specified distance from the viewing system to be tested. In the present exemplary embodiment for testing thermal imagers, the pattern generation partially takes place mechanically. A thermal contrast is generated using heat pump elements. At suitable positions, sensors are provided which record the temperature of the material and pass it to a temperature control system. A microcontroller circuit in the pattern generator takes care of the control of the mechanics and the regulation of the thermal contrast of the patterns. In this connection, it should be noted that thermal image systems are in a strict sense sensitive to radiation differences in a particular wavelength range and that the relationship between temperature difference and radiation difference is dependent on the prevailing ambient temperature. Attention must be paid to this effect especially for a test system which has to be usable in the field, that is to say at different ambient temperatures. It will be clear to the person skilled in the art how account can be taken of this in controlling the thermal contrast of the patterns to be presented. An alternative approach may be, for example, to make the set criteria dependent on the ambient temperature when assessing the performances with the thermal imager.

In the exemplary embodiment discussed here no use is made of optics.

Figure 2:
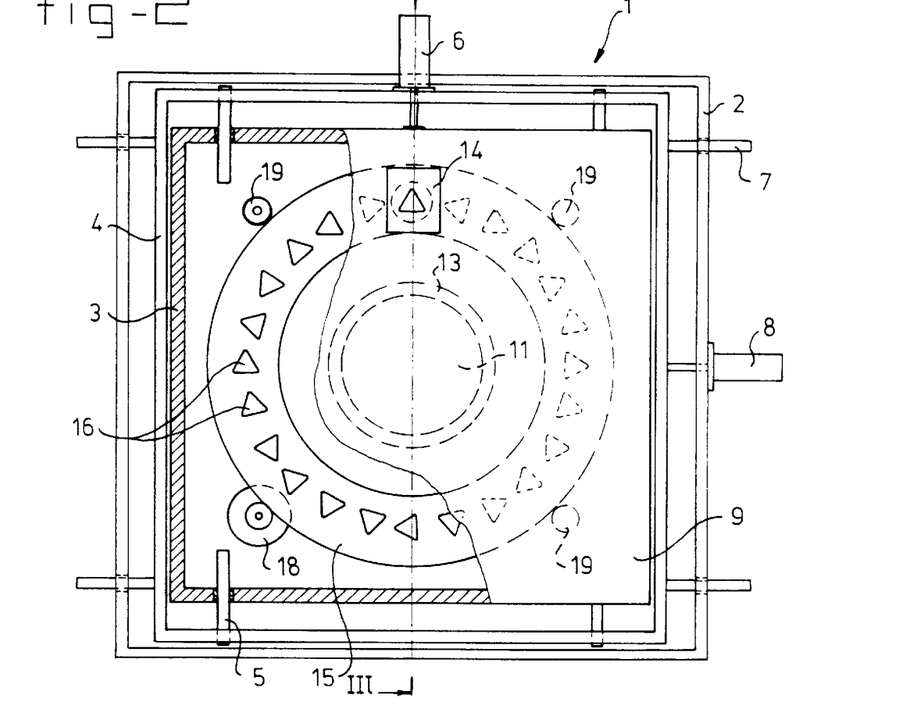
FIG. 2 shows a front view, partly broken away, of the mechanical section of the pattern generating unit of the test system for thermal imagers according to the present invention.

The pattern-generating unit or text object 1 which is shown in FIG. 2 and can be used as pattern generator 22 in FIG. 1 has a frame or casing 2, which can be placed, for example, on a tripod or other support so as to be stably placed at a distance from a viewing system to be tested. For this purpose, a pattern generator unit 1 is generally placed at a distance of some tens of meters, for example 25 meters, from the viewing system. Attached to the frame 2 is a subframe 3, which subframe 3 is mounted in a yoke 4. Vertical pins 5 securely mounted on the yoke 4 project displaceably through the subframe 3, as shown, so that the subframe 3 can be moved up and down in the drawing with a drive 6, in this case a linear electric motor, which is coupled to it. Further horizontal pins 7 securely mounted on the yoke 4 project displaceably through the frame 2. Thus the yoke 4 and with it the subframe 3 can consequently be moved to the left and to the right with the aid of a drive unit 8, in this case also a linear electric motor which is coupled to the yoke 4. The drive units 6, 8 may be of any suitable type, for example hydraulic or pneumatic piston/cylinder units or other drive units generating a suitable movement of the yoke 4 or the subframe 3, respectively, with respect to the frame 2. The drive unit 6 is, as shown, securely joined to the yoke 4 and movable there with respect to the frame 2. The drive unit 8 is securely joined to the frame 2, as shown. The subframe 3 can therefore be moved up and down and to the left and to the right with respect to the frame 2. By means of these measures, the patterns to be generated by the pattern generator can be presented in various positions with respect to the viewing system to be tested. This is advantageous, in particular, for a correct test of the resolution performances of camera systems having a detector array.

The subframe 3 has a plate body 9, in the advantageous case made of aluminium or a suitable aluminium alloy. During use, the frame 2 is placed in such a way that said plate body 9 is directed towards the viewing system 100, which is shown diagrammatically and on a considerably reduced scale in FIG. 3. To test so-called thermal imagers, it is preferable for the design of the outside surface or front surface of the plate body 9 to be dark, preferably black, for example as a result of coating said surface with a black pigment. As shown, the plate body 9 is square. However, other rectangular shapes or, for example, a circular shape can also be chosen. The shape of the plate body 9, like the shape of the frame 2, the subframe 3 and the yoke 4, are not decisive for the invention.

First embodiment of pattern-generating unit for patterns with different appearance.

Figure 3:
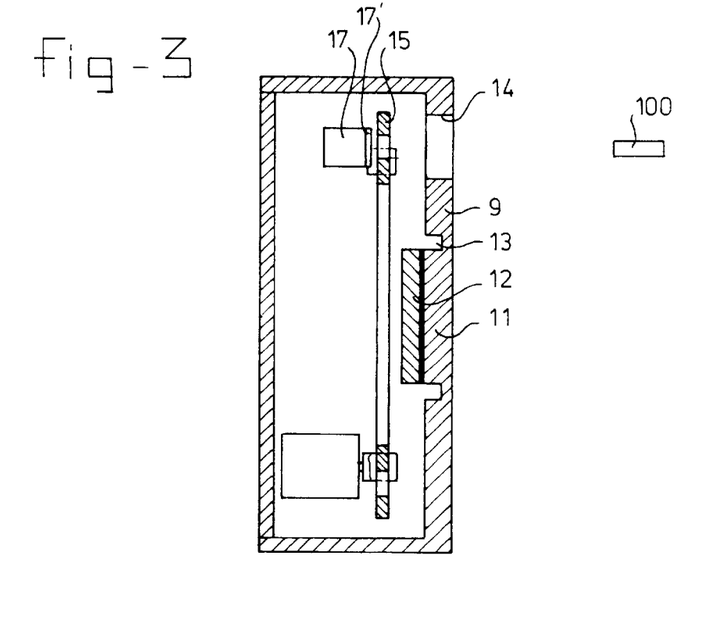
FIG. 3 shows a view in cross section along the line III—III in FIG. 2.

In the pattern-generating unit 1 shown in FIGS. 2 and 3, there is furthermore an opening 14 in the plate body 9 above the subarea 11 which is suitable to generate a thermal pattern having a blurred circumferential edge and which will be discussed below. Through said opening 14, a portion of a ring 15 is visible which can be rotated around its center. Constructed in said ring 15 is a series of holes 16 which are positioned in a circular pattern and are preferably situated at a uniform distance from one another. Said holes 16 have, in the embodiment shown, the shape of an equilateral triangle. The triangles vary in size and orientation. The orientation of the holes 16 with respect to the radial of the ring 15 is arbitrary, with the apex pointing upwards, downwards, to the left or to the right. If the apex of the triangular opening 16 points downwards, this means that the apex points towards the center of the ring. The pitch of the holes 16 is dimensioned in such a way that, when the ring 15 is suitably rotated, one hole 16 is always visible through the opening 14 in the plate-shaped body 9. In the ring, there is one hole 16 in the form of a cross, and in the case of one position of the ring, none of the holes is visible through the opening 14 (not shown in FIG. 2). Holes 16 having a differing appearance can therefore be presented in succession at the opening 14 or, if suitably rotated, the hole can be closed. A heat pump 17 which is aligned with the opening 14 is placed behind the ring 15 with respect to the plate-shaped body 9. The heat pump 17 is covered by the ring 15. In the embodiment which is advantageous at present, a small plate 17' of the same material as the plate body 9 and the rotatable body 15 is provided at the front of the heat pump, and the surface of the plate body 9, ring 15 and small plate 17' are coated with the same black pigment. Between pump and small plate, there is an interlayer of, for example, a material with good heat transfer. The openings 16 in the ring 15 define a window through which, via the opening 14, radiation originating from the small plate 17' can be presented to the viewing system 100. Both on the ring 15 and on the small plate 17' sensors are placed which record the temperature of the material. In the neutral state, the temperature difference between the ring and the small plate 17' is adjusted to zero as accurately as possible by the temperature control system and the patterns are not, or scarcely, visible to the user of the thermal imager to be tested. A pattern can be made visible by generating a temperature difference between the small plate 17' situated at the rear and the ring with the aid of the respective heat pump. Patterns will therefore be presented to the viewing system 100 which have an equilateral triangular shape and have a randomly differing appearance in four variants, and with a freely adjustable temperature difference with respect to their background. A pattern in the form of a cross can also be presented, and with the aid of this, the focus and other adjustments of the camera to be tested can be regulated beforehand. During a test for determining the sensitivity of a viewing system for small temperature differences, the hole 14 can be closed in order to avoid disturbances of these measurements as much as possible.

In the present embodiment variant, the ring 15 is rotated by a stepping motor 18 which acts on the outside circumferential edge of the ring 15. Supporting rollers 19 which are rotatable about their axis provide further support for the ring 15.

As a result of operating the drive unit 6 and/or 8, it is possible to displace the ring 15 together with the plate body 9 horizontally and/or vertically to a limited extent in order to change the position of a window 16, visible through the opening 14, with respect to the viewing direction of the camera. This may be of advantage, for example, in testing so-called detector-array cameras.

It goes without saying that variants are also conceivable in the advantageous version shown and described here. Thus, the plate body 9 can be mounted on the fixed frame 2 and can furthermore be separate from the subframe 3 and the yoke 4. The ring 15 is then displaceable horizontally and vertically with respect to the opening 14 by means of the drive units 6 and 8. Instead of a single ring 15, two or more rings situated concentrically within one another can, for example, be used. It will be clear that, in the case of a version in accordance with FIGS. 2 and 3, a second or a larger opening 14 must be provided for this purpose in the plate body 9, as well as a second heat pump. Instead of a ring 15, a disc can also be used. It is also possible to present various radiation patterns generated with the holes 16 simultaneously to the viewing system 100 simultaneously. For example, more openings 14 at a distance from one another are constructed for this purpose in the plate-shaped body 9 in order to show various subregions of the ring 15 through the plate body 9. Instead of holes 16 or corresponding windows in the shape of equilateral triangles, other suitable shapes can also be chosen. If, for example, a bar pattern is chosen, at least two variants (a vertical bar and a horizontal bar) can thereby be presented through the opening 14. Instead of holes 16 having a similar shape, holes 16 of different shape may also be chosen (for example a triangle, a rectangle and a circle randomly alternating in one series). It is also possible to omit the function which is achieved by the subarea 11 of the plate body 9 from the pattern-generating unit 1. The opposite, in which the function which is achievable with the ring 15 is omitted from the pattern-generating unit is also possible.

It is important that component test objects of differing appearance can be presented simultaneously or in succession to the telescope or camera with the test system according to the present invention.

Embodiment of pattern-generating unit for a pattern having a blurred edge

Figure 4:
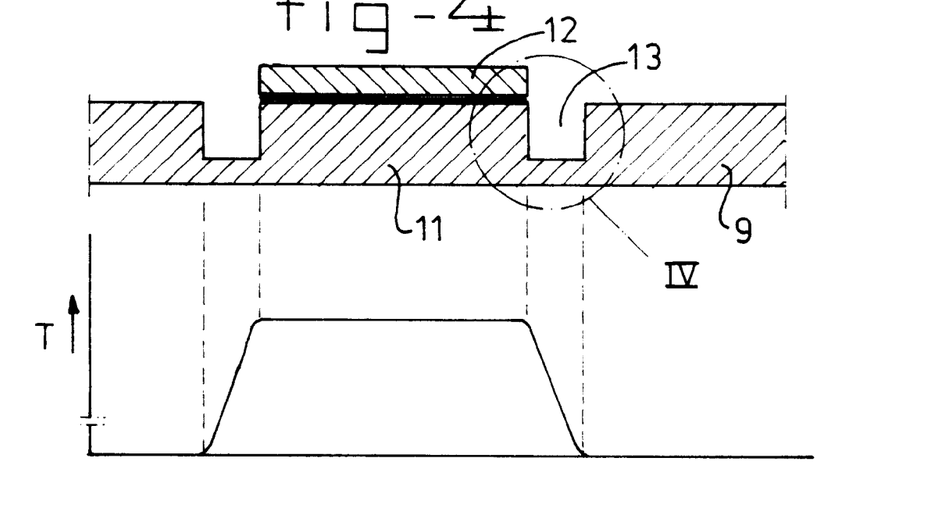
FIG. 4 shows a detail of FIG. 3, tilted through 90°, with a graphical reproduction of the variation in the radiation intensity.
Figure 5:
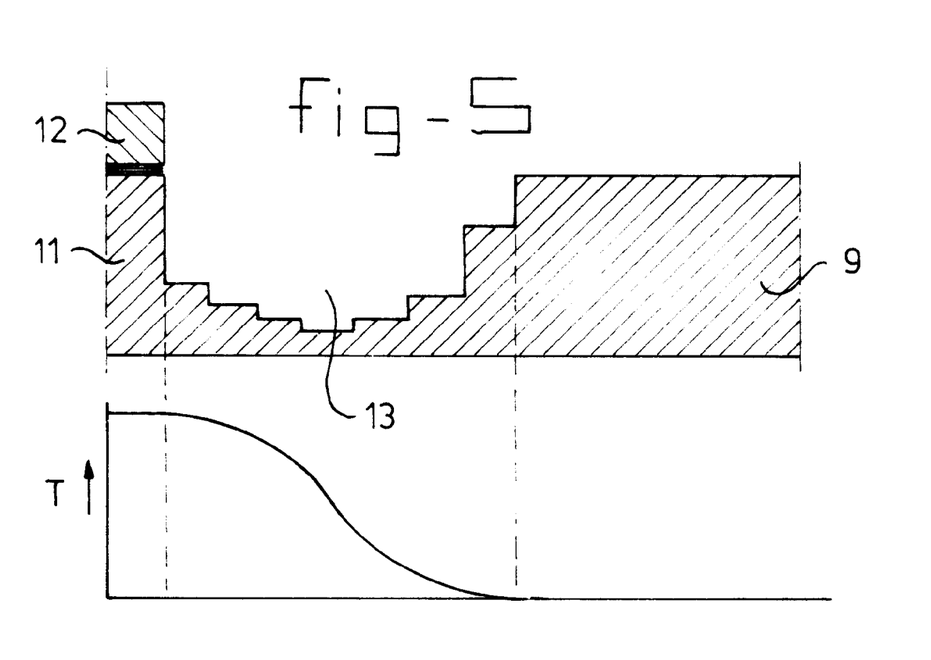
FIG. 5 shows an alternative for detail A of FIG. 4 with a graphical reproduction of the corresponding variation in the radiation intensity.

According to a second aspect of the invention, the plate body 9 comprises a central area 11 for creating a thermal pattern having a blurred edge. For this purpose a heat pump element 12 is mounted against the rear of the plate body 9 in said central region 11. Placed at the front of plate body 9, an absorption body, are two temperature sensors, one in the central area and one in the surrounding area, which serve to pass the temperature difference to the temperature control system. Both are provided with the same pigment as the plate body 9. Said element 12 is, for example, a so-called Peltier element. A suitable interlayer of, for example, a material with good heat transfer can be provided between said element 12 and the plate body 9. Because only a limited area 11 of the plate body 9 is heated or cooled, while the plate body 9 is made of heat-conducting material, such as aluminium, but also, for example, steel or copper or a heat-conducting plastic material, which heat-conducting material always still exhibits some resistance to heat transfer, the temperature of the plate body 9 will gradually decrease or increase, respectively, to the temperature which prevails at the circumferential edge of the plate body 9 with increasing distance from the subarea 11, even if the plate thickness of the plate body 9 is uniform. To control the temperature variation along the circumferential edge of the central subarea 11, it is preferable, according to the present invention, to construct a resistance element, in this case a heat resistance element 13, along said circumferential edge. According to the version which is advantageous at present, the plate body 9 is equipped for this purpose with a narrow section 13 around the heated or cooled subarea 11. FIG. 4 shows how a temperature profile can be achieved between the heated subarea 11 and the surrounding plate body 9 with such a narrow section 13. In the diagram, the temperature increase in the subareas of the plate body 9 is shown for this purpose with respect to the temperature at the circumferential edge of the plate body 9, with the proviso that a uniform ambient temperature prevails, only the element 12 being present as heat source. If the subregion 11 is cooled by means of the element 12 with respect to the plate body 9, an inverse temperature variation naturally applies. FIG. 5 shows the temperature profile which can be achieved if the shape of the narrow section 13 is adapted. In this connection, FIG. 5 is on a different scale to FIG. 4, wherein the thickness of narrow section 13 is variable and shows only a detail A of FIG. 4. It will be clear to the person skilled in the art how the shape of the narrow section 13 can be adapted for another desired temperature profile. Although the subarea 11 has a circular shape in the advantageous exemplary embodiment, for example, a rectangular, square or triangular, or polygonal, and so forth, shape can be chosen. Instead of one heated or cooled subarea 11, a number of cooled or heated subareas or a number of cooled and a number of heated subareas which are at a mutual spacing can be chosen. In this connection, it is not required that the subareas are situated in the central area of the plate body 9. It is also not absolutely required, but advantageous, that the subarea 11 forms part of the plate body 9. It is important to generate with a radiation source which emits radiation which can be recorded by the viewing system an image which is to be presented to the viewing system and which comprises one or more patterns having blurred edges so that the image gradually merges into its surroundings. The description given above of the preferred version in relation to the subarea 11 and the different variants thereof can also be regarded in isolation from what follows and in isolation from mounting in a subframe 3 which can be moved up and down and to the left and to the right with respect to a frame 2. Viewed per se, the achievement of one or more radiation images to be presented to the viewing system, which radiation images have thermal patterns having blurred edges so that they gradually merge into their surroundings, forms a separate invention which can possibly be described in a so-called divided patent application of this patent application.

Second embodiment of pattern-generating unit for patterns with different appearance.

Figure 6:
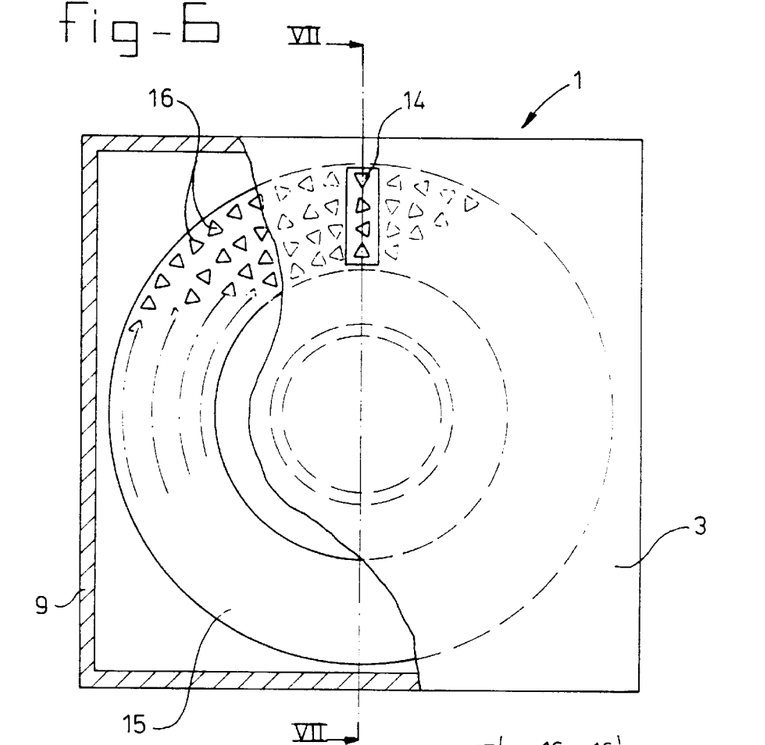
FIG. 6 shows an alternative version of the device according to FIG. 2.
Figure 7:
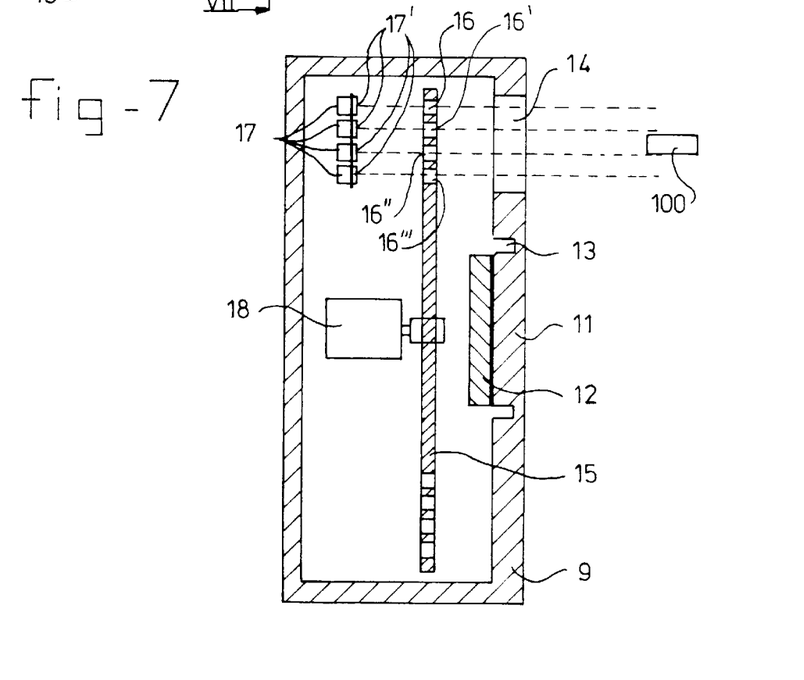
FIG. 7 shows a view in cross section along the line VII—VII of FIG. 6.

FIGS. 6 and 7 show an alternative embodiment of the pattern-generating unit of FIG. 2. In this case, four circular, concentric rows of openings 16, 16', 16", 16''' are incorporated in the ring 15. As a result, four openings are simultaneously situated behind the opening 14. These openings serve as window. The objects which define these openings also define the boundary of windows through which radiation of heat pump 17 may pass.

Situated behind each of the openings 16, 16', 16", 16''' is a heat pump 17 on whose front a small plate 17' is placed which is of the same material and provided with the same pigment as the plate body 9 and the said rotatable ring 15. Situated between heat pump 17 and small plate 17' is an interlayer of, for example, a material with good heat transfer. Provided both on the ring 15 and on the small plates 17' are sensors which record the temperature of the material. In the neutral state, the temperature difference between the ring 15 and the small plates 17' is regulated as accurately as possible to zero, and the patterns are not, or scarcely, visible to the user of the thermal image camera to be tested. A pattern can be made visible by generating a temperature difference between the small plate 17' situated at the rear and the ring 15 with the aid of the respective heat pump 17. As a result of rotating the ring 15 and as a result of alternately providing a temperature difference with the ring 15 for one of the four small plates 17', all the patterns which are situated on the ring 15 can therefore be shown to the observer in turn. In this version, triangles of different size, orientation and position with respect to the imaging surface of the viewing system 100, or other patterns in random sequence and having an arbitrary temperature difference with the background can therefore be shown under these circumstances. In this version, a fixed frame is sufficient and the measures which have been taken to provide a moving subframe, as described in the case of the first exemplary embodiment, can be omitted. Variation in the vertical position of the triangles is realized in this case by showing identical triangles having different distances from the center of the disc. Variation in the horizontal position can be realized by means of small angular rotations of the disc. As stated, providing this variation in the position of the patterns with respect to the imaging surface of the sensor is advantageous in particular for testing modern electro-optical systems which are constructed around detector arrays, such as focal plane array cameras. In the present variant, the ring 15 is driven by a stepping motor 18 which acts on the axis of the ring 15.

Exemplary embodiment for a viewing system having a different spectral sensitivity The exemplary embodiment shown in FIG. 1 of the test system can also serve for telescopes or sensors which are sensitive to visible light and/or near-infrared radiation, such as binoculars, CCD cameras and image intensifiers. To test different types of sensors correctly, however, different embodiments of the pattern-generating unit 21 will be necessary. Without going into detail for every embodiment, the following general remarks can be made.

For optical systems or sensors which are sensitive to visible light, it will be obvious to generate the desired patterns with the aid of a computer having good graphic facilities and to image them by means of a cathode-ray tube (CRT). Systems are at present available on the market with which images can be generated with high spatial and luminance resolution. The desired patterns, such as triangles or patterns having blurred edges in different appearance can be presented with these in a flexible manner on a uniform or any other desired background. It should be noted that patterns having blurred edges are particularly advantageous for testing the sensitivity of thermal image systems to (thermal) contrasts. If this proves advantageous, the sensitivity of systems to brightness contrast can be tested, if desired, with patterns having a sharp edge. If desired, the viewing systems can be tested with different background levels with the aid of, for example, neutral density (attenuating) filters. It will be clear to the person skilled in the art that, in the case of such a device, account should be taken of the spectral distribution of the light emitted by the monitor, the filters used, and the spectral sensitivity of the sensor system to be tested. CCD camera systems, in particular, may be sensitive to near-infrared radiation. Measures should also be taken in the case of measurements in the field to counteract disturbance of the measurements as a consequence of other light sources. An important advantage of the device described above is that no mechanically moving parts are present. If desired, the image-generating computer 22 can be combined with the control unit 21 shown in FIG. 1.

In the case of image intensifiers, the test system should essentially generate images which have a very low luminance. For testing in the field, this imposes great requirements on the occurrence of disturbances as a consequence of other light sources. Different generations of image intensifiers exhibit important differences in spectral sensitivity, particularly in the near-infrared. At the same time, it may be more advantageous for the generation of the patterns to make use of a light source having a continuous spectral distribution than of a CRT, which generally exhibits a strongly peaked distribution. Also for this reason, it may be advantageous to consider a variant of the exemplary embodiments for the thermal pattern generator for testing image intensifiers. It is also true for this purpose that, if desired, the sensitivity of image intensifiers to luminance differences can be tested with patterns having a sharp edge. For testing image intensifiers, it is also less important that the patterns are always presented in different positions, which may simplify the mechanical design of a pattern generator. Any luminance filters to be used in the test must have a virtually identical attenuation over the entire spectrum to which the image intensifiers are sensitive. Luminance attenuation may optionally be effected in another way, for example with the aid of a shutter.

Test procedure

A procedure which can be followed for testing a viewing system is explained on the basis of an unrestrictive example which is advantageous at present. After the pattern generator has been placed at the prescribed distance from the system to be tested, an adjustment pattern will be presented with it, for example in the form of a cross, with which the test operative can regulate the focusing and any other adjustments. The test operative is well acquainted with the use of the viewing system and the measurement procedure.

After a first adjustment, two series of measurements may, for example, take place, one to test camera resolution and one to test contrast sensitivity. For many viewing systems, the optimum adjustment, on the one hand, for achieving optimum resolution performance and, on the other hand, for achieving optimum detection performance is different. For this reason, each series of measurements is preceded by an adjustment procedure in which one or more patterns are presented which are very similar in appearance to the patterns which will be presented during the measurement, for example a triangle having a high contrast or a pattern having an blurred edge and a low contrast. The test operative can thereby adjust the viewing system optimally for the task. The adjustment patterns disappear only when the test operative indicates he is completely satisfied with the adjustments made.

During the test, the patterns are always shown one by one for a limited time and the test operative gives a response after each presentation using the response unit. For example, if a triangular pattern is presented, he (or she) gives the orientation of the triangle, or in the case of a pattern having an unsharp edge, he indicates whether the contrast is positive or negative. A series of test measurements may start, for example, with a series of simple conditions, such as the presentation of relatively large triangular patterns, or patterns having a relatively high contrast. In the case of a system in good order, the judgement made by the test operative must then virtually always be good. If a relatively large number of errors is made, the cause may be a defective viewing system, an incorrect adjustment or may be due to the test operative. In that case, after readjustment, the simple test conditions can be presented again. If the correct score turns out to be too low again, this component of the test can be repeated by another test operative. If the required score is not achieved by this test operative, it is assumed that the camera does not meet the required criteria on this point. If this score is satisfactory for the simple conditions, the test series can be continued with more difficult conditions, for example smaller triangular patterns or patterns having a lower contrast. The degree of difficulty of these conditions is chosen in such a way that the test person will occasionally make an incorrect judgement even with a viewing system which is in good order. With a defective viewing system, however, the number of errors will turn out to be higher.

Given the quality of a camera system of the respective type which is in good order (said quality can be determined, for example, on leaving the factory using the measurement system which can be obtained by the test system by adjusting the control programs), the accepted margin within which the quality may vary, the selected patterns and the number of presentations, it is possible to calculate precisely how many incorrect responses are allowed to be made during a series. The probability that a camera is approved or even rejected mistakenly as a result of statistical fluctuations can also be calculated. If the number of incorrect responses in a test is too high, the camera is rejected on the basis of this component. If desired, consideration can be given to using a second test operative. In a field test, the viewing system, if rejected, can optionally be demounted and subjected to a test again in the laboratory. If there has to be a high confidence that the camera meets the requirements imposed (for example, in the case of certain missions), the probability of mistaken acceptance or rejection can be reduced by increasing the number of presentations.

We claim:

1. A test system for viewing systems, which test system comprises a test object comprising various component test objects differing in appearance from one another that can simultaneously or sequentially be shown to the viewing system, which test object is to be placed at a distance from the viewing system being tested and which test object is to be rendered displayable with the viewing system for an inspection unit, with which inspection unit an appearance of said component test objects is determined, a control unit (21) that is connected with said test object for displaying said component test objects, with a predetermined appearance, on the basis of reference data stored in said control unit, and with an input unit (23) that is connected to said control unit (21) for supplying data about the appearance of said component test objects to said control unit (21), which control unit determines if the data of the appearance of said respective component test object correspond with the reference data of the appearance of the corresponding test object that are stored in said control unit.

2. Test system according to claim 1, with the test object provided with one or more component test objects which have a sharp edge boundary.

3. Test system according to claim 2, wherein the component test objects determine the boundary of a window through which a radiation source placed at a distance from the window can be shown.

4. Test system according to claim 1, with the test object provided with one or more of said component test objects comprising patterns with blurred edges.

5. Test system according to claim 4, with the test objects provided with a radiation source which, via a heat resistance element is joined to an absorption body surrounding the radiation source at its circumference.

6. Test system according to claim 1, wherein the component test objects are joined to a movable body so as to be observable successively to the viewing system as a result of moving said body.

7. Test system according to claim 6, wherein the movable body comprises a rotatable disc or ring.

8. Test system according to claim 1 wherein the component test objects can be moved up and down and/or to the left and to the right over a relatively short distance with respect to the distance between the viewing system and the test object in order to avoid disturbances of the test as a consequence of imaging errors.

9. Test system according to claim 1, wherein the component test objects are equilateral triangles, in particular of different size and orientation.

10. Test system according to claim 1, wherein the component test object is a plate body having a cooled or heated subarea, along the circumference of which a heat resistance element to the surrounding plate body is placed.

11. A test system for viewing systems, which test system comprising a test object comprising and adapted to show component test objects differing in appearance from one another that can simultaneously or sequentially be shown to the viewing system, which test object is to be placed at a distance from the viewing system and which is to be rendered displayable with the viewing system for an inspection unit, with which inspection unit the appearance of said component test objects is determined, a control unit (21) that is connected with said test object for displaying component test objects, with a predetermined appearance, on the basis of reference data stored in said control unit and with an input unit (23) that is connected to said control unit (21) for supplying data about the appearance of the shown component test objects to said control unit (21), which control unit determines if the data of the appear ance of said respective component test object correspond with the reference data of the appearance of the corresponding test object that are stored in said control unit, wherein at least one of said component test objects comprises a pattern with blurred edges.

12. The test system of claim 11, wherein said one component test object comprising a pattern with blurred edges further comprises a variable thickness designed and adapted to present a predetermined temperature gradient across said one component test object.

13. The test system of claim 10, wherein said heat resistance element comprises a circumferential area of reduced thickness relative to the thickness of said surrounding plate.

14. A test system for viewing systems, comprising a test object comprising various component test objects to be shown to the viewing system, which test object is to be placed at a distance from the viewing system and which is to be rendered displayable with the viewing system for an inspection unit, with which inspection unit the quality of the operation of the viewing system can be determined on the basis of said display, wherein said component test objects differ in appearance from one another and the test system being suitable for presenting said component test objects simultaneously or one after another to said inspection unit to determine a property of the displayed component test objects, with the test object provided with one or more of said component test objects comprising patterns with blurred edges.

15. Test system according to claim 14, with the test objects provided with a radiation source which, via a heat resistance element, is joined to an absorption body surrounding the radiation source at its circumference.

16. Test system according to claim 14, with the test object provided with one or more of said component test objects which have a sharp edge boundary.

17. Test system according to claim 16, wherein the component test objects determine the boundary of a window through which a radiation source placed at a distance from the window can be shown.

18. The test system of claim 15, wherein said heat resistance element comprises a region surrounding said radiation source with a reduced thickness relative to said absorption body.

19. The test system of claim 18, wherein said reduced thickness region comprises a variable thickness.

* * * * *